United States Patent
Lee et al.

(10) Patent No.: US 11,573,436 B2
(45) Date of Patent: Feb. 7, 2023

(54) BUBBLE REMOVAL APPARATUS COMPRISING AN ACOUSTIC WAVE GENERATOR THAT FORMS A STANDING ACOUSTIC FIELD BY GENERATING A PAIR OF ACOUSTIC WAVES AND BUBBLE REMOVAL METHOD USING THE SAME

(71) Applicant: INDUSTRY-ACADEMIC COOPERATION FOUNDATION, YONSEI UNIVERSITY, Seoul (KR)

(72) Inventors: Hyungsuk Lee, Seoul (KR); Byungjun Kang, Seoul (KR); Donyoung Kang, Seoul (KR); Chanryeol Rhyou, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 23 days.

(21) Appl. No.: 17/243,432

(22) Filed: Apr. 28, 2021

(65) Prior Publication Data
US 2021/0354054 A1    Nov. 18, 2021

(30) Foreign Application Priority Data

Apr. 29, 2020    (KR) .......................... 10-2020-0052079

(51) Int. Cl.
*G02F 1/13*    (2006.01)
*B01D 19/00*    (2006.01)

(52) U.S. Cl.
CPC ....... *G02F 1/1303* (2013.01); *B01D 19/0078* (2013.01)

(58) Field of Classification Search
CPC ............ B01D 19/0078; B01D 19/0073; G02F 1/1316

See application file for complete search history.

(56) References Cited

U.S. PATENT DOCUMENTS 5,022,899 A * 6/1991 Hohlfeld ............... A61M 1/363
96/381

FOREIGN PATENT DOCUMENTS

| EP | 0427555 A1 | 5/1991 |
| JP | S631086 A | 1/1988 |
| JP | 2003328888 A | * 11/2003 |
| JP | 2003328888 A | 11/2003 |
| JP | 2004204269 A | * 7/2004 |
| JP | 2004204269 A | 7/2004 |
| JP | 2010118576 A | * 5/2010 |
| JP | 2010118576 A | 5/2010 |

(Continued)

OTHER PUBLICATIONS

Korean Intellectual Property Office, Office Action Issued in Application No. 10-2020-0052079, dated Jul. 5, 2021, 27 pages.

(Continued)

*Primary Examiner* — Paul C Lee
(74) *Attorney, Agent, or Firm* — McCoy Russell LLP

(57) ABSTRACT

Provided is a bubble removal apparatus for removing a bubble on a substrate during a process of manufacturing a display panel or a semiconductor using a liquid, and more particularly, to a bubble removal apparatus using acoustic waves that collects a bubble on a substrate using an acoustic wave and removes the bubble by moving the bubble to a desired position, and a bubble removal method using the same.

16 Claims, 13 Drawing Sheets

(56) References Cited

FOREIGN PATENT DOCUMENTS

KR      20010096504 A    11/2001

OTHER PUBLICATIONS

State Intellectual Property Office of the People's Republic of China, Office Action and Search Report Issued in Application No. 202110473763.8, dated May 7, 2022, 16 pages. (Submitted with Partial Translation).
Korean Intellectual Property Office, Notice of Allowance Issued in Application No. 10-2020-0052079, dated Jul. 22, 2022, 7 pages. (Submitted with Partial Translation).

* cited by examiner

BUBBLE REMOVAL APPARATUS COMPRISING AN ACOUSTIC WAVE GENERATOR THAT FORMS A STANDING ACOUSTIC FIELD BY GENERATING A PAIR OF ACOUSTIC WAVES AND BUBBLE REMOVAL METHOD USING THE SAME

CROSS-REFERENCE TO RELATED APPLICATIONS

The present application claims priority to Korean Patent Application No. 10-2020-0052079 filed on Apr. 29, 2020. The entire contents of the above-listed application is hereby is incorporated by reference for all purposes.

TECHNICAL FIELD

The following disclosure relates to a bubble removal apparatus for removing a bubble on a substrate during a process of manufacturing a display panel or a semiconductor using a liquid, and more particularly, to a bubble removal apparatus using acoustic waves that collects a bubble on a substrate using an acoustic wave and removes the bubble by moving the bubble to a desired position, and a bubble removal method using the same.

BACKGROUND AND SUMMARY

Bubbles within a substrate generated during a process of manufacturing a display panel using liquid, for example, a liquid crystal display (LCD) substrate, are a critical factor that degrades the quality of the display panel. Even if a liquid crystal is injected in a vacuum state when the liquid crystal is injected onto the substrate during the process of manufacturing the LCD substrate, there is probability that the bubbles may exist between a thin film transistor (TFT) and a color filter. In the existing process, the substrate with bubbles is considered to be defective and should be reassembled or discarded after disassembly. As a result, this causes the manufacturing cost of the LCD to be increased and the yield to be lowered. The bubbles generated during a process of manufacturing a semiconductor in addition to the display panel cause a decrease in a precision of the process and a decrease in production yield, thereby reducing a function of a semiconductor chip or increasing the price of the product. Therefore, conventionally, various technologies have been used to remove bubbles generated during the semiconductor process.

Typically, a bubble removal method using ultrasonic waves or a filter is mainly used. In the case of the conventional bubble removal method using ultrasonic waves, the bubbles on a liquid crystal solution are removed as expansion and explosion of the bubbles are induced by applying ultrasonic waves having a frequency of 1 MHz or less onto the liquid crystal solution. Such a method has an advantage that the bubbles may be removed without affecting a solution transfer, such as resistance, but has a disadvantage in that it is not possible to remove bubbles of a microscopic size (a diameter of several tens of micrometers or less), and a microstructure (pattern) on a substrate or a photosensitizer is damaged by a shock wave caused by explosion of the bubbles. In addition, in the case of the bubble removal method using the filter, the bubbles are removed by the filter into a system that transfers the liquid crystal solution, and since a configuration thereof is simple, there is an advantage that it is easy to apply to an existing process system, but there is a disadvantage in that the filter acts as a resistance, so that pressure required for transferring the solution increases, and a maintenance cost increases due to periodic replacement of the filter.

Therefore, there is a need to develop a new bubble removal technology that solves the disadvantages of the existing bubble removal technologies.

An embodiment of the present disclosure is directed to providing a bubble removal apparatus using acoustic waves that collects a bubble through an acoustic wave and separates the bubble from the substrate by transferring the bubble to a desired position, and a bubble removal method using the same.

In one general aspect, a bubble removal apparatus using acoustic waves that remove a bubble in a solution applied to one surface of a substrate, includes: an acoustic wave generator provided on the other surface of the substrate and applying an acoustic wave to the solution, wherein the acoustic wave generator forms a standing acoustic field by generating a pair of acoustic waves of the same wavelength in opposite directions and then superimposing the pair of acoustic waves, collects the bubble at an antinode of the standing acoustic field, and removes the bubble from the solution by transferring the bubble to a specific position by adjusting a position of the antinode through a phase shift of the standing acoustic field or a movement of the acoustic wave generator.

In another general aspect, a bubble removal apparatus using acoustic waves that remove a bubble in a solution applied to one surface of a substrate, includes: an acoustic wave generator provided on the other surface of the substrate and applying an acoustic wave to the solution, wherein the acoustic wave generator removes the bubble from the solution by transferring the bubble to the outside of the solution through a directional acoustic wave applied in one direction of the substrate.

In still another general aspect, a bubble removal apparatus using acoustic waves that remove a bubble in a solution applied between a pair of substrates, includes: an acoustic wave generator provided on an outer surface of one of the substrates or an outer surface of each of the pair of substrates and applying an acoustic wave to the solution, wherein the acoustic wave generator forms a standing acoustic field by generating a pair of acoustic waves of the same wavelength in opposite directions and then superimposing the pair of acoustic waves, collects the bubble at an antinode of the standing acoustic field, and removes the bubble from the solution by transferring the bubble to a specific position by adjusting a position of the antinode through a phase shift of the standing acoustic field or a movement of the acoustic wave generator.

The specific position may be a peripheral portion of the pair of substrates.

The acoustic wave generator may include an acoustic wave generation unit applying an acoustic wave to the solution; and an acoustic wave transmission unit for acoustically coupling the substrate and the acoustic wave generation unit, and the acoustic wave transmission unit may be made of a polymer material or a liquid.

The bubble removal apparatus may further include a bubble detection unit detecting the position, size, or speed of the bubble in the solution; a transfer unit for pulling the acoustic wave generator to transfer the acoustic wave generator to a specific position on the substrate; and a control unit for controlling the acoustic wave generator, the bubble detection unit, and the transfer unit.

In still another general aspect, a bubble removal apparatus using acoustic waves that remove a bubble in a solution accommodated or flowing in the inside of a tube, includes: an acoustic wave generator made of a flexible material to surround the tube along a circumferential direction on an outer surface of the tube, and applying an acoustic wave to the solution, wherein the acoustic wave generator forms a standing acoustic field by generating a pair of acoustic waves of the same wavelength in opposite directions and then superimposing the pair of acoustic waves, collects the bubble at an antinode of the standing acoustic field, and removes the bubble from the solution by transferring the bubble to a specific position by adjusting a position of the antinode through a phase shift of the standing acoustic field.

The specific position may be an outer side of the tube in a radial direction.

A plurality of acoustic wave generators may be disposed to be spaced apart from each other along a length direction of the tube.

The bubble removal apparatus may further include a reservoir communicating with the tube; and a connection passage connecting the tube with the reservoir, wherein the acoustic wave generator induces the bubble to the connection passage by transferring the bubble in the solution to an outer side of the tube in a radial direction through a standing acoustic wave, and the induced bubble is stored in the reservoir.

The connection passage may be formed to be inclined upwardly toward the reservoir.

The tube may be a dispenser having an inlet formed at one side and a nozzle formed at the other side, and the acoustic wave generator may be configured to apply the standing acoustic wave between the inlet and the nozzle.

The acoustic wave generator may include a pair of electrodes disposed such that a plurality of spaced portions are formed, and apply a plurality of acoustic waves having different wavelengths to the solution by spacing distances of the spaced portions disposed to be different from each other.

The acoustic wave generator may apply an acoustic wave having a frequency between 10 MHz to 10 GHz to the solution, and remove bubbles having a diameter of 100 nm to 200 pm.

In another general aspect, a bubble removal method using the bubble removal apparatus using acoustic waves as described above: includes forming a standing acoustic field by generating a pair of acoustic waves of the same wavelength in opposite directions through an acoustic wave generator and then superimposing the pair of acoustic waves; collecting a bubble at an antinode of the standing acoustic field by applying the standing acoustic field to a solution; and removing the bubble from the solution by transferring the collected bubble to a specific position by moving the antinode through a phase shift of the standing acoustic field or a movement of the acoustic wave generator.

In still another general aspect, a bubble removal method using the bubble removal apparatus using acoustic waves as described above, includes: forming a standing acoustic field by generating a pair of acoustic waves of the same wavelength in opposite directions through an acoustic wave generator and then superimposing the pair of acoustic waves; collecting a bubble at an antinode of the standing acoustic field by applying the standing acoustic field to a solution; and removing the bubble from the solution by transferring the collected bubble to a specific position by moving the acoustic wave generator through a transfer unit.

The bubble removal method may further include: before the forming of the standing acoustic field, detecting a position of the bubble in the solution through a bubble detection unit; and moving the acoustic wave generator to be close to the bubble through the transfer unit.

DETAILED DESCRIPTION

A bubble removal apparatus using acoustic waves and a bubble removal method using the same according to an embodiment of the present disclosure are configured to remove a bubble from a solution by acoustically coupling an acoustic wave generator to a substrate on which the solution is applied or a tube through which the solution is being transferred, and then applying an acoustic wave to the solution and moving a bubble existing inside the solution to the outside of the substrate or to a specific position where the bubble may be easily removed.

In order to move the bubble, a phase-modulated standing acoustic wave or a directional acoustic wave may be used. For the generation of the acoustic wave as described above, a surface acoustic wave device, a piezoelectric device, and a micro-fabricated ultrasound transducer array may be used.

When an object to be removed from the bubble is a solution applied between a pair of flat plates, on a single flat plate, or on a curved plate, an acoustic wave device manufactured in the form of a flat plate may be used. In addition, a flexible acoustic wave device capable of generating acoustic waves even in a bent state may be used to remove the bubble in a solution contained inside a curved surface such as a tube.

In addition, in order to acoustically couple the substrate or tube and the acoustic wave device, an acoustic coupling material may be used between the device and the object. In addition, when it is necessary to transfer the acoustic wave device, a liquid material may be used. In the case of using the liquid material, a liquid with low evaporation such as oil may be used, or an injection means capable of periodically or continuously injecting the liquid may be provided.

Figure 1:
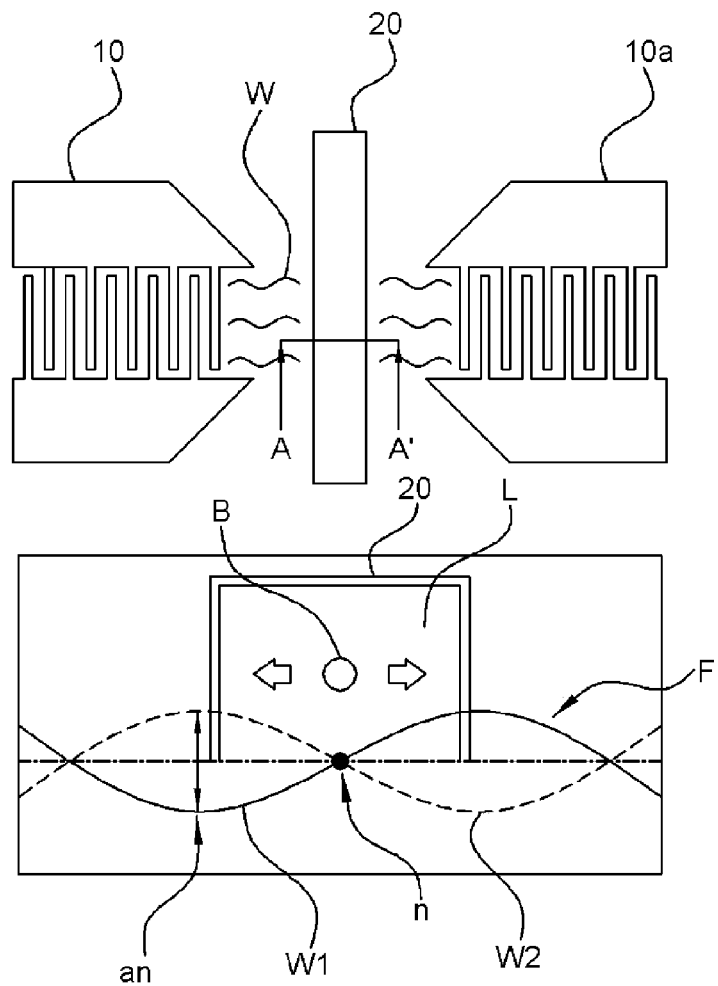
FIG. 1 is a conceptual diagram illustrating a bubble collection principle using acoustic waves.

FIG. 1 illustrates a conceptual diagram illustrating a bubble collection principle using acoustic waves.

As illustrated, in order to transfer the bubble B in a solution L flowing inside a channel 20, the bubble B may be transferred to a position where it is easy to remove by placing acoustic wave generators 10 and 10a on one side or the other side or both sides of the channel 20, generating a standing acoustic wave W through the acoustic wave generators 10 and 10a and fixing (collecting) the bubble B at a specific position on the solution L, and then controlling a phase of the standing acoustic wave W.

At this time, in order to generate the standing acoustic wave W, acoustic waves W1 and W2 of the same wavelength may be generated in opposite directions and then superimposed. In the case of using a surface acoustic wave device as the acoustic wave generators 10 and 10a, surface acoustic waves generated from both electrodes of the device are superimposed to generate a standing surface acoustic wave, and when the standing surface acoustic wave is transferred to the fluid disposed on the surface acoustic wave substrate, a standing acoustic field F is generated. In the case of applying a pressure wave to water by using two or more piezoelectric devices as the acoustic wave generators 10 and 10a, pressure waves are superimposed in water to generate a standing acoustic field F. At this time, a place where amplitude of the pressure of the standing acoustic field is the largest is called an antinode (an), and a place where the amplitude is the smallest is called a node (n). At this time, particles in the fluid whose acoustic contrast factor ($\varphi$) determined by Equation 1 below is a positive number move to the node (n) of the standing acoustic field, and particles whose acoustic contrast coefficient ($\varphi$) is a negative number move to the antinode (an) of the standing acoustic field.

$$\varphi = \frac{5\rho_p - 2\rho_m}{2\rho_p + \rho_m} - \frac{\beta_p}{\beta_m}\varphi \quad \text{(Equation 1)}$$

(where, $\rho_p$: particle density, $\rho_m$: fluid density, $\beta_p$: particle compression rate, and $\beta_m$: fluid compression rate)

At this time, in a general fluid such as water, since the acoustic contrast factor ($\varphi$) of the bubble is the negative number, the bubble moves to the antinode (an) of the standing acoustic field F.

In the case of moving the bubble B using the phase modulated standing acoustic wave as suggested in the present disclosure, it is possible to calculate the condition for optimally transferring the bubble through a theoretical equation. An acoustic radiation force ($F_{rad}$), which is a force exerted on the particles in the standing acoustic field, is expressed as in Equation 2 below.

$$F_{rad} = F_0 \sin(2kx - \phi) \quad \text{(Equation 2)}$$

$$F_0 = \frac{\pi\rho|A|^2 kR}{1 - \frac{\omega_0^2}{\omega^2}}, \, b = 6\pi R\mu, \, k = \frac{2\pi}{\lambda}$$

(where, R: radius of bubble, $\mu$: viscosity of fluid, $\phi$: phase of acoustic wave, $\omega_0$: resonance frequency of bubble, $\omega$: acoustic frequency, |A|: complex amplitude of velocity potential, and $\lambda$: wavelength of acoustic wave)

In addition, a drag force ($F_{drag}$) caused by the fluid when the particles move is expressed as in Equation 3 below.

$$F_{drag} = 6\pi R\mu \frac{dx}{dt} \quad \text{(Equation 3)}$$

In this case, when the Reynolds number is small, an acceleration term may be neglected, and therefore, it may be seen that the acoustic radiation force ($F_{rad}$) and the drag force ($F_{drag}$) are equal, and thus a motion equation of the particle may be described as in Equation 4 below.

$$b\frac{dx}{dt} = F_0 \sin(2kx - \phi) \quad \text{(Equation 4)}$$

In this case, when the phase of the acoustic wave is continuously changed, the phase is changed by $\dot\phi t$. By introducing the assumption that the particle may move linearly by receiving the maximum force in the above situation, the equation of motion of the particle may be transformed into a nondimensionalized equation (Equation 5) as follows.

$$\frac{dX^*}{dT^*} = \sin(R^* X^* - T^*) \quad \text{(Equation 5)}$$

$$X^* = \frac{b\dot\phi}{F_0}x, \, T^* = \dot\phi t, \, R^* = \frac{2kF_0}{b\dot\phi}$$

(where, $X^*$: nondimensionalized displacement, $T^*$: nondimensionalized time, and $R^*$: radius of nondimensionalized particle)

In this case, since the case in which the radius ($R^*$) of the nondimensionalized particle is 1 means that the particle may move by receiving the maximum force, an optimal phase modulation rate value may be obtained at this time. That is, since $$R^* = \frac{2kF_0}{b\dot\phi_{optimal}} = 1$$

is satisfied, the optimal phase modulation rate $$\left(\dot\phi_{optimal} = \frac{2kF_0}{b}\right)$$

may be expressed as in Equation 6 below.

$$\dot\phi_{optimal} = \frac{2kF_0}{b} \quad \text{(Equation 6)}$$

Therefore, it is possible to calculate the optimal phase modulation rate according to the radius of the bubble through Equation 6 above, thereby increasing a bubble transfer efficiency. In other words, in the case in which a moving speed of the antinode through phase modulation is too fast, since the bubble collected in the antinode may be separated from the antinode during transfer, the moving speed of the antinode may be optimized to safely transfer the bubble.

Hereinafter, bubble removal apparatuses 100 to 700 using acoustic waves according to various embodiments of the present disclosure will be described in detail with reference to the accompanying drawings.

First Embodiment: Standing Acoustic Wave—Single Type

Figure 2:
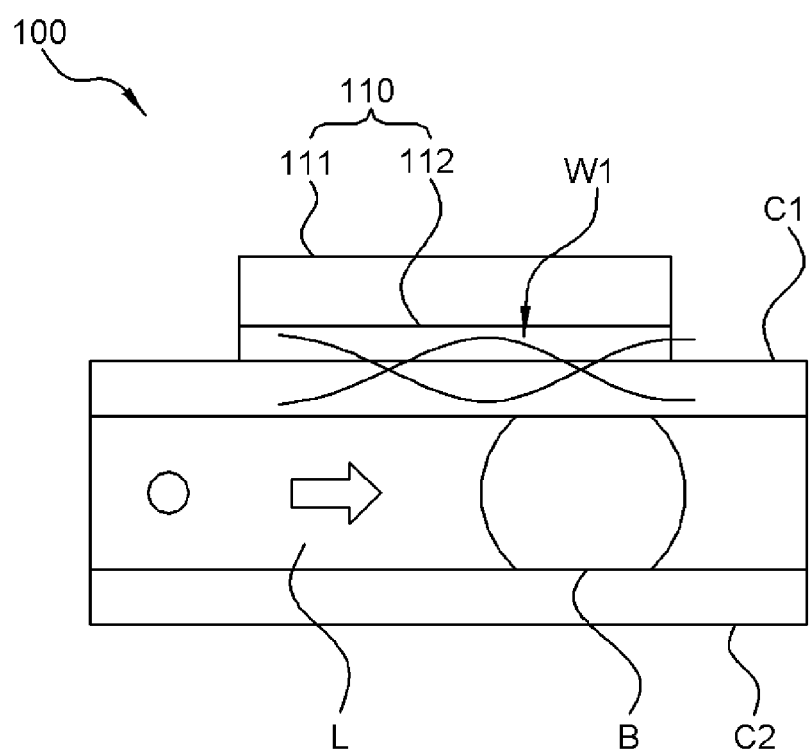
FIG. 2 is a schematic view of a bubble removal apparatus using acoustic waves according to a first embodiment of the present disclosure.

FIG. 2 illustrates a schematic view of a bubble removal apparatus using acoustic waves 100 (hereinafter, referred to as "bubble removal apparatus") according to a first embodiment of the present disclosure.

As illustrated, the bubble removal apparatus 100 according to the first embodiment of the present disclosure is configured to remove a bubble B on a solution L accommodated between a pair of substrates C1 and C2. To this end, the bubble removal apparatus 100 includes an acoustic wave generator 110 provided on an outer surface of any one substrate C1 of the pair of substrates C1 and C2.

The acoustic wave generator 110 includes an acoustic wave generation unit 111 for applying a standing acoustic wave W1 to the solution L, and an acoustic wave transmission unit 112 for acoustically coupling the substrate C1 and the acoustic wave generation unit 111. The acoustic wave transmission unit 112 may be made of a polymer material such as PDMS or a liquid material such as oil/water.

The bubble removal apparatus 100 having the configuration as described above collects the bubble B on the solution L through the antinode of the standing acoustic wave W1 by applying the standing acoustic wave W1 to the solution L through the acoustic wave generation unit 111. Next, the bubble removal apparatus 100 shifts a phase of the standing acoustic wave W1, moves the bubble B to a specific position, and then separates the bubble B from the solution L to remove the bubble B. The specific position may be a peripheral portion or a corner portion of the pair of substrates C1 and C2.

Second Embodiment: Standing Acoustic Wave—Plural Type

Figure 3:
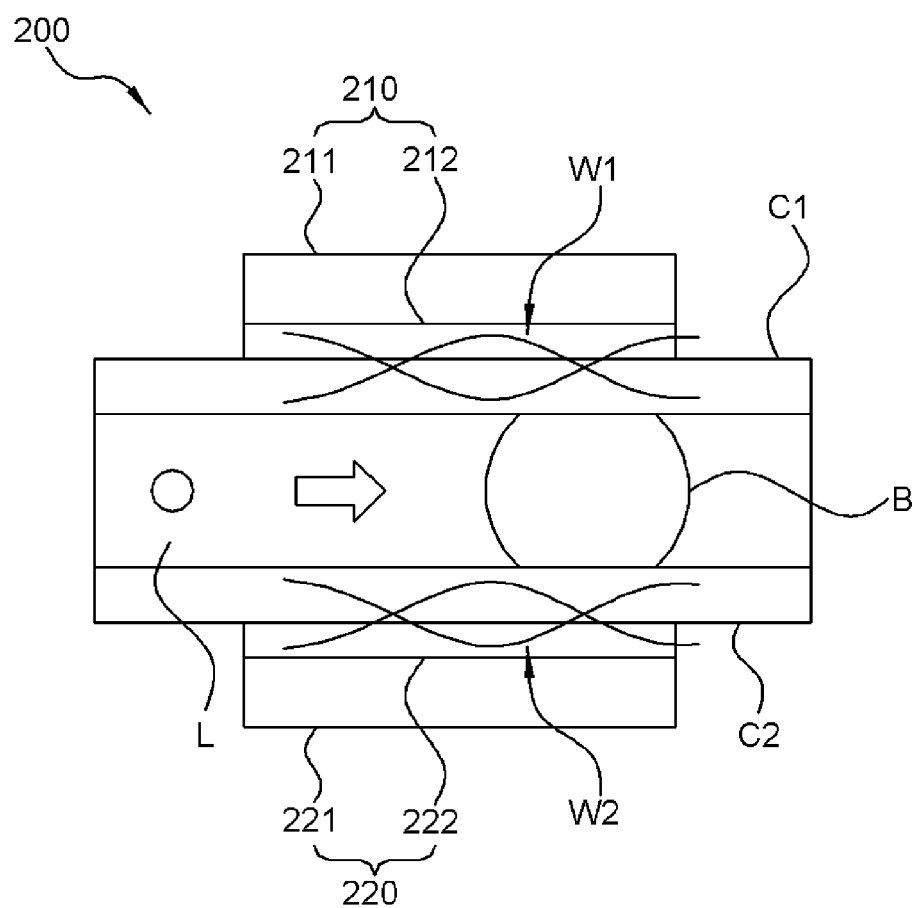
FIG. 3 is a schematic view of a bubble removal apparatus using acoustic waves according to a second embodiment of the present disclosure.

FIG. 3 illustrates a schematic view of a bubble removal apparatus 200 according to a second embodiment of the present disclosure.

As illustrated, the bubble removal apparatus 200 according to the second embodiment of the present disclosure is configured to remove a bubble B on a solution L accommodated between a pair of substrates C1 and C2, and includes a first acoustic wave generator 210 provided on an outer surface of one substrate Cl of the pair of substrates C1 and C2, and a second acoustic wave generator 220 provided on an outer surface of the other substrate C2 thereof.

The first acoustic wave generator 210 includes a first acoustic wave generation unit 211 for applying a first standing acoustic wave W1 to the solution L, and a first acoustic wave transmission unit 212 for acoustically coupling the substrate C1 and the first acoustic wave generation unit 211. In addition, the second acoustic wave generator 220 includes a second acoustic wave generation unit 221 for applying a second standing acoustic wave W2 to the solution L, and a second acoustic wave transmission unit 222 for acoustically coupling the substrate C2 and the second acoustic wave generation unit 221.

The bubble removal apparatus 200 having the configuration as described above has an advantage capable of improving a bubble removal speed as compared to the first embodiment described above, because of applying the first and second standing acoustic waves W1 and W2 to the solution L through the first and second acoustic wave generation units 211 and 221, separating the bubble from the solution L, and removing the bubble B.

Third Embodiment: Directional Acoustic Wave Type

Figure 4:
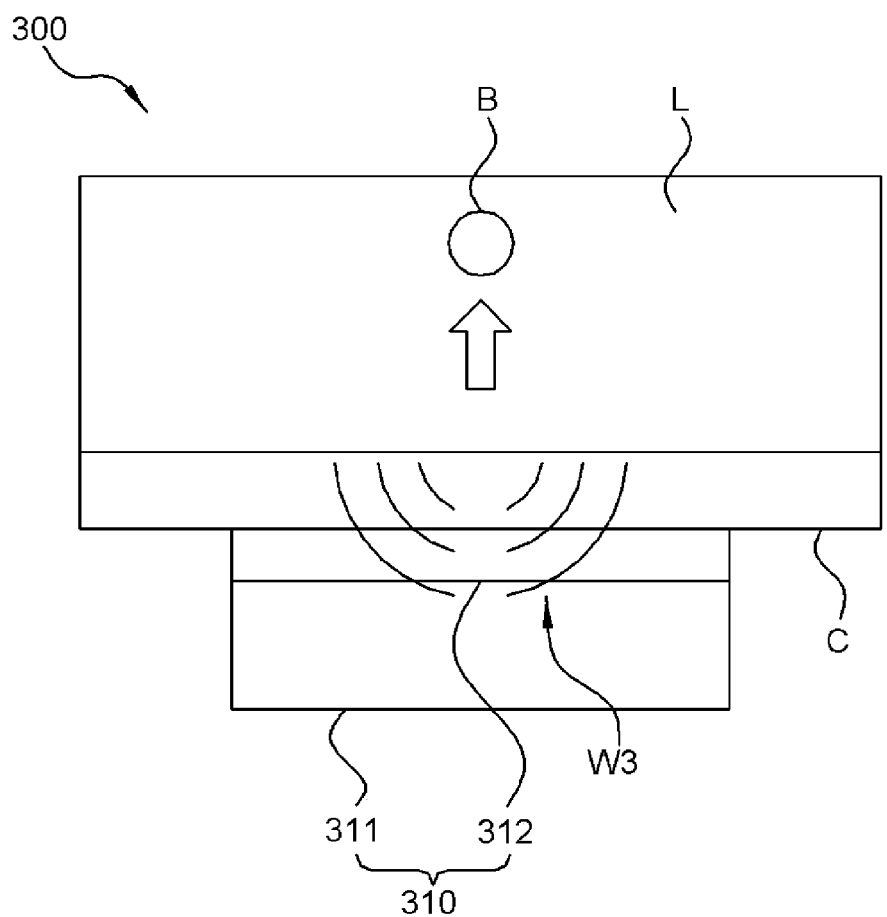
FIG. 4 is a schematic view of a bubble removal apparatus using acoustic waves according to a third embodiment of the present disclosure.

FIG. 4 illustrates a schematic view of a bubble removal apparatus 300 according to a third embodiment of the present disclosure.

As illustrated, the bubble removal apparatus 300 according to the third embodiment of the present disclosure is configured to remove a bubble B on a solution L applied on one surface or the other surface of a single substrate C. To this end, the bubble removal apparatus 300 includes an acoustic wave generator 310 provided on an outer surface of a side on the substrate C on which the solution L is not applied.

The acoustic wave generator 310 includes an acoustic wave generation unit 311 for applying a directional acoustic wave W3 applied in a single direction to the solution L, and an acoustic wave transmission unit 312 for acoustically coupling the substrate C and the acoustic wave generation unit 311. The acoustic wave transmission unit 312 may be made of a polymer material such as PDMS or a liquid material such as oil/water.

The bubble removal apparatus 300 having the configuration as described above applies the directional acoustic wave W3 to the side opposite to the substrate C on the solution L through the acoustic wave generation unit 311 to collect the bubble B on the solution L, transfers the bubble B to the outside of the solution L, that is, to the opposite side of the side where the solution L is applied to the substrate C, separates the bubble B from the solution L, and removes the bubble B.

Since the bubble removal apparatus 300 of the embodiment as described above may remove the bubble B by only transferring the bubble B to the outside of the solution L through the directional acoustic wave, precise phase control is not required, and therefore, there is an advantage in that the configuration is simple and control is easy compared to the embodiments described above.

Fourth Embodiment: Acoustic Wave Generator—Transfer Type

Figure 5:
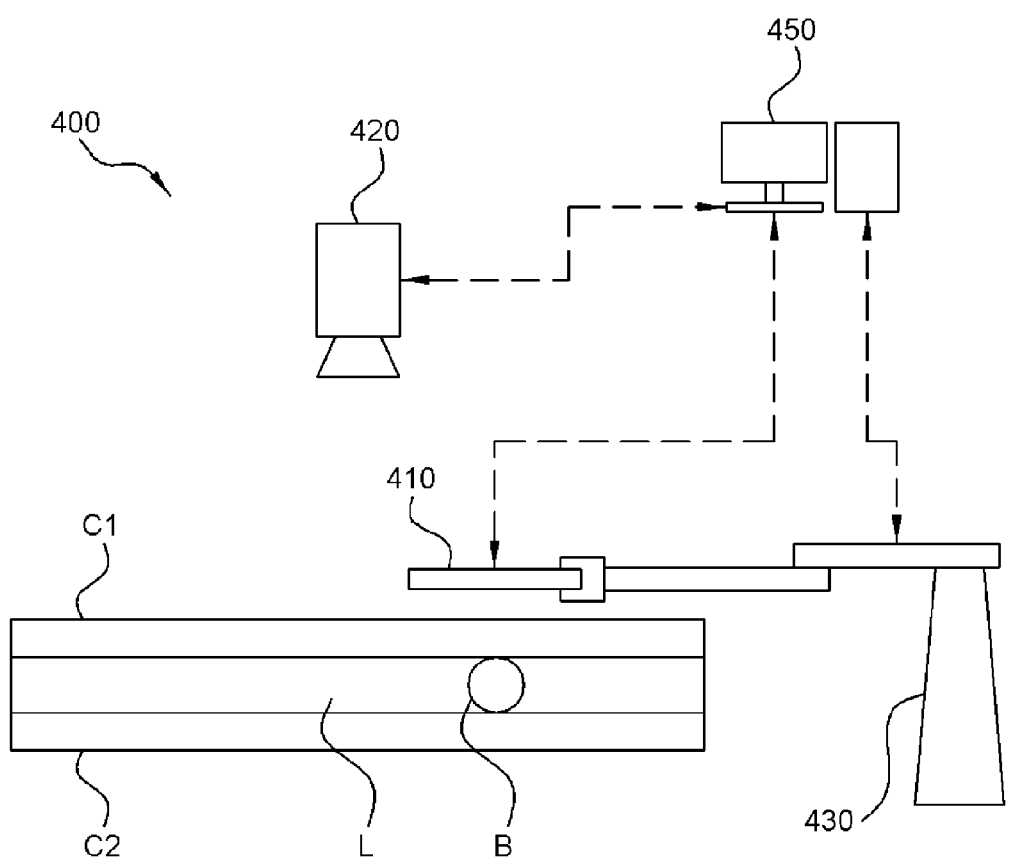
FIG. 5 is a schematic view of a bubble removal apparatus using acoustic waves according to a fourth embodiment of the present disclosure.

FIG. 5 illustrates a schematic view of a bubble removal apparatus 400 according to a fourth embodiment of the present disclosure.

As illustrated, the bubble removal apparatus 400 according to the fourth embodiment of the present disclosure is configured to remove a bubble B on a solution L accommodated between a pair of substrates C1 and C2. To this end, the bubble removal apparatus 400 includes an acoustic wave generator 410 provided on an outer surface of any one substrate C1 of the pair of substrates C1 and C2, a bubble detection unit 420 for detecting the bubble B on the solution L, a transfer unit 430 for transferring the acoustic wave generator 410 by pulling the acoustic wave generator 410, and a control unit 450 for communicating with the acoustic wave generator 410, the bubble detection unit 420, and the transfer unit 430 to control the acoustic wave generator 410, the bubble detection unit 420, and the transfer unit 430.

The acoustic wave generator 410 includes an acoustic wave generation unit for applying a standing acoustic wave to the solution L, and an acoustic wave transmission unit for acoustically coupling the substrate C1 and the acoustic wave generation unit.

The bubble detection unit 420 is configured to detect the bubble B on the solution L, and may be machine vision for analyzing the position, size, and speed of the bubble B. As the bubble B is detected through the bubble detection unit 420, a movement path of the acoustic wave generator 410 may be optimized.

The transfer unit 430 is configured to move the acoustic wave generator 410 on the substrate C1 in a plane direction, and may be, for example, a robot arm for pulling and directly moving the acoustic wave generator 410, or a motor stage in which the acoustic wave generator 410 is installed and the acoustic wave generator 410 is moved by a motor.

The control unit 450 is configured to control the application of the standing acoustic wave of the acoustic wave generator 410, analyze bubble information through the bubble detection unit 420, and control the transfer unit 430, and the configuration of a typical control unit may be applied.

A bubble removal method using the bubble removal apparatus 400 according to the fourth embodiment of the present disclosure having the configuration as described above will be described in detail with reference to the drawings.

Figure 6:
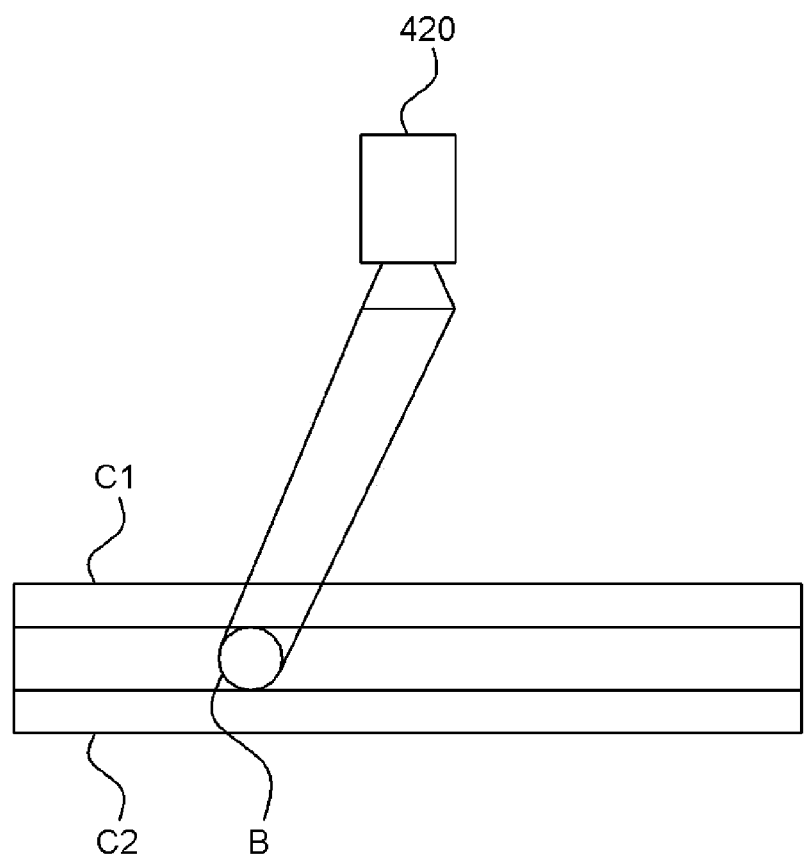
FIGS. 6 to 8 are schematic views of a bubble removal method using the bubble removal apparatus using acoustic waves according to the fourth embodiment of the present disclosure.
Figure 7:
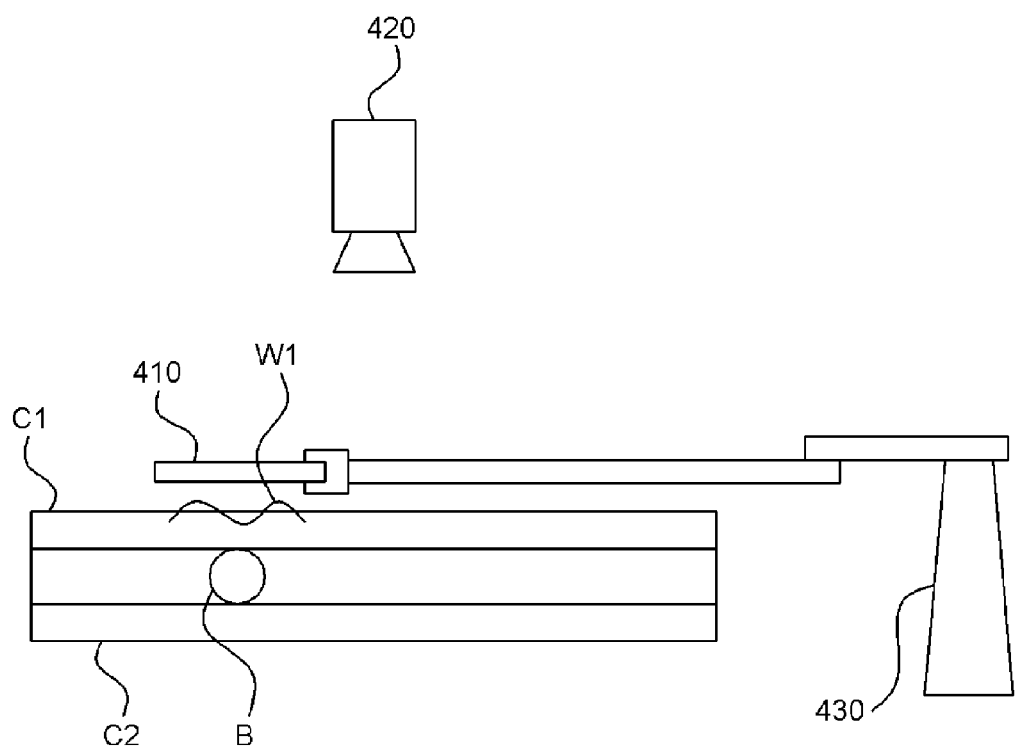
Figure 8:
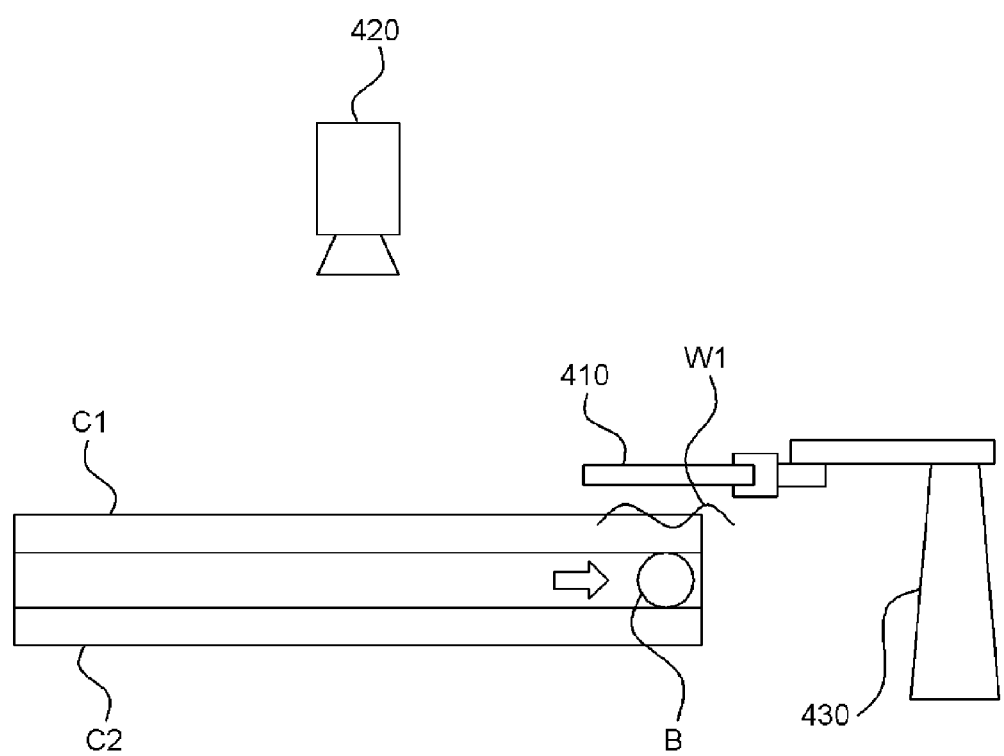

FIGS. 6 to 8 illustrate schematic views of a bubble removal method using the bubble removal apparatus 400 according to the fourth embodiment of the present disclosure.

First, as illustrated in FIG. 6, a bubble analysis step is performed in which the bubble detection unit 420 analyzes the size, position, and speed of the bubble by acquiring an image of the bubble B to derive an optimal apparatus movement path for removing the bubble.

Next, as illustrated in FIG. 7, a bubble collecting step is performed in which the bubble B is collected by applying a standing acoustic wave W1 after placing the acoustic wave generator 410 on the substrate C1 adjacent to the bubble B through the transfer unit 430, and a fine position of the bubble B is controlled through phase control of the standing acoustic wave W1.

Next, as illustrated in FIG. 8, a bubble transfer step in which the acoustic wave generator 410 is moved to a position where the bubble is easily removed through the transfer unit 430, and the bubble B collected through the acoustic wave generator 410 is moved to the position where the bubble is easily removed is performed. In this case, the position where the bubble is easily removed may be a peripheral portion of the substrate Cl such as a corner of the substrate C1.

Since the bubble removal apparatus 400 according to the fourth embodiment of the present application described above transfers the bubble B collected through the acoustic wave generator 410 through the transfer unit 430, there is an advantage in that it is possible to control the position of a wide range of the bubble compared to bubble transfer using phase control.

In addition, the bubble removal speed may be maximized by analyzing the size and position of bubble in the solution using the bubble detection unit 420, and optimizing the movement path of the acoustic wave device using a path optimization algorithm.

In addition, when the bubble moves over a short distance, the position of the bubble is finely adjusted through the phase control of the acoustic wave applied to the bubble, and when the bubble moves over a long distance, the acoustic wave device is transferred through the transfer unit 430 in a state in which the bubble is collected through the application of the acoustic wave, thereby making it possible to remove the bubble.

Fifth Embodiment: Flexible Type

Figure 9A:
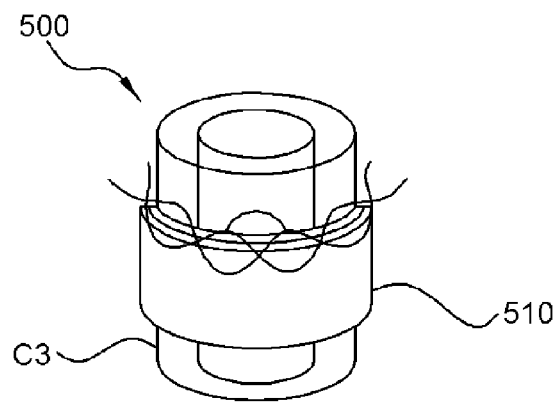
FIGS. 9A and 9B are schematic view of a bubble removal apparatus using acoustic waves according to a fifth embodiment of the present disclosure.
Figure 9B:
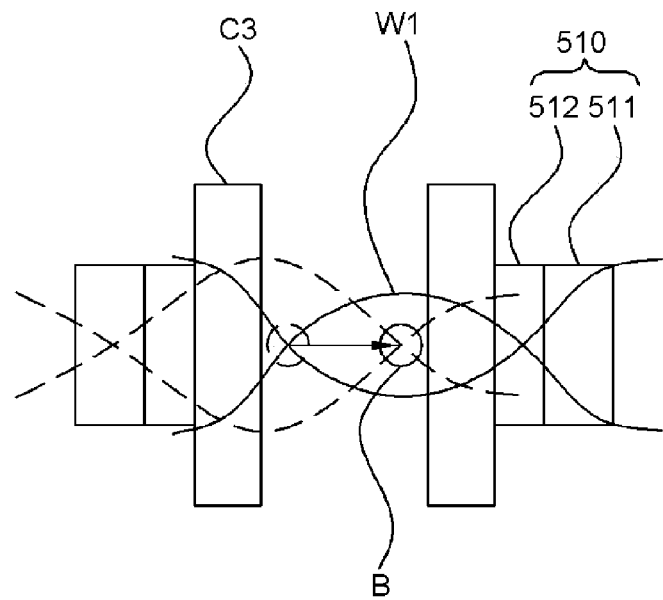

FIG. 9A illustrates a schematic view of a bubble removal apparatus 500 according to a fifth embodiment of the present disclosure and FIG. 9B illustrates a cross-sectional view of the bubble removal apparatus 500 according to the fifth embodiment of the present disclosure.

As illustrated, the bubble removal apparatus 500 according to the fifth embodiment of the present disclosure is configured to remove a bubble B on a solution accommodated in a tubular substrate C3. To this end, the bubble removal apparatus 500 includes an acoustic wave generator 510 provided on an outer surface of the tubular substrate C3 and configured to surround the tubular substrate C3 along a circumferential direction of the tubular substrate C3. At this time, since the acoustic wave generator 510 is configured to surround a curved surface, it may be made of a flexible material. The acoustic wave generator 510 includes an acoustic wave generation unit 511 for applying a standing acoustic wave W1 to the solution, and an acoustic wave transmission unit 512 for acoustically coupling the substrate C3 and the acoustic wave generation unit 511.

The bubble removal apparatus 500 having the configuration as described above collects the bubble B on the solution through the antinode of the standing acoustic wave W1 by applying the standing acoustic wave W1 to the solution through the acoustic wave generation unit 511. Next, the bubble removal apparatus 500 shifts a phase of the standing acoustic wave W1, moves the bubble B to a specific position, and then separates the bubble B from the solution L to remove the bubble B. The specific position may be an end portion of the substrate C3.

Sixth Embodiment: Multi-Flexible Type

Figure 10A:
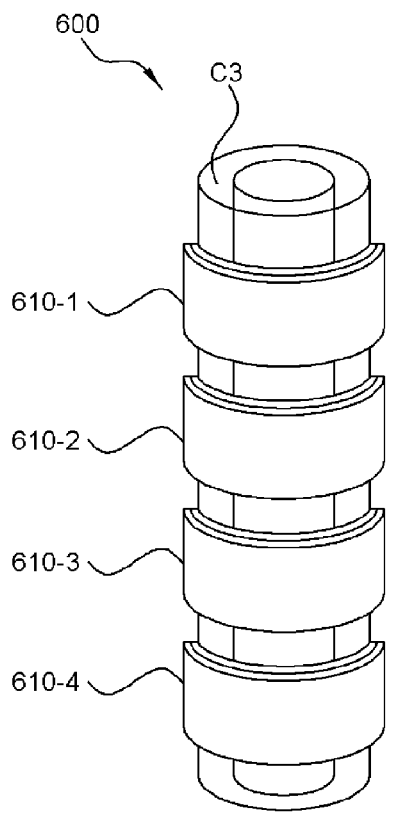
FIGS. 10A and 10B are schematic view of a bubble removal apparatus using acoustic waves according to a sixth embodiment of the present disclosure.
Figure 10B:
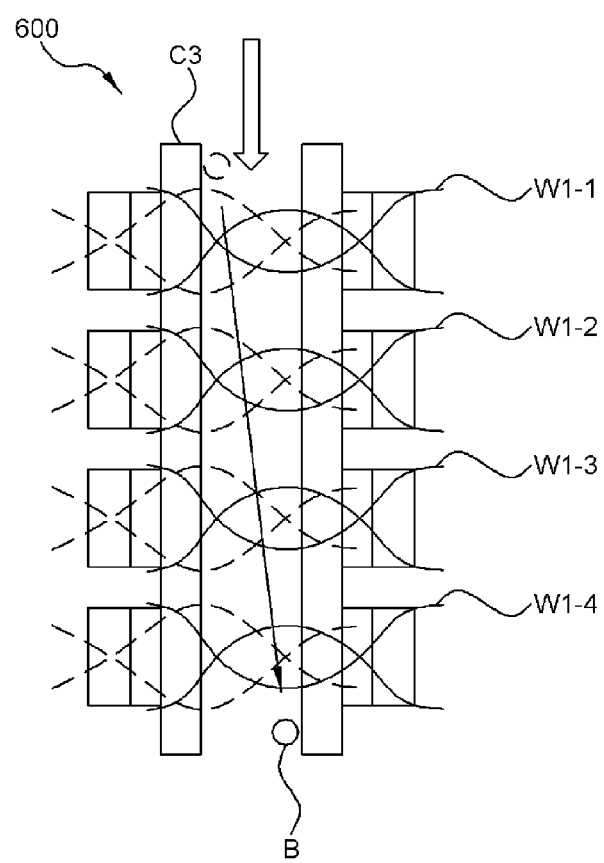

FIG. 10A illustrates a schematic view of a bubble removal apparatus 600 according to a sixth embodiment of the present disclosure, and FIG. 10B illustrates a cross-sectional view of the bubble removal apparatus 600 according to the sixth embodiment of the present disclosure.

As illustrated, the bubble removal apparatus 600 according to the sixth embodiment of the present disclosure is configured to remove a bubble B on a solution accommodated in a tubular substrate C3. To this end, the bubble removal apparatus 600 includes an acoustic wave generator 610 provided on an outer surface of the tubular substrate C3 and configured to surround the tubular substrate C3 along a circumferential direction of the tubular substrate C3. At this time, a plurality of acoustic wave generators 610-1, 610-2, 610-3, and 610-4 may be disposed to be spaced apart from each other along a length direction of the tubular substrate C3.

The bubble removal apparatus 600 having the configuration as described above has an advantage capable of inducing the movement of the bubble B in a radial direction of the tubular substrate C3 in a laminar or turbulent fluid flowing at a high speed along the inside of the tubular substrate C3 by collecting and moving the bubble B through the standing acoustic wave W1 and applying the respective standing acoustic waves W1-1, W1-2, W1-3, and W1-4 at various positions along the length direction of the tubular substrate C3.

As in the fifth and sixth embodiments described above, in order to remove the bubble in a liquid surrounded by a curved surface, the acoustic wave may be applied in a direction perpendicular to the fluid movement direction (radial direction of the tubular substrate). In particular, when the liquid flows at high speed, the bubble may be moved to a desired position on the tubular substrate by expanding a region to which the acoustic wave is applied by arranging the acoustic wave device at various positions on the curved surface.

Seventh Embodiment: Dispenser Type

Figure 11:
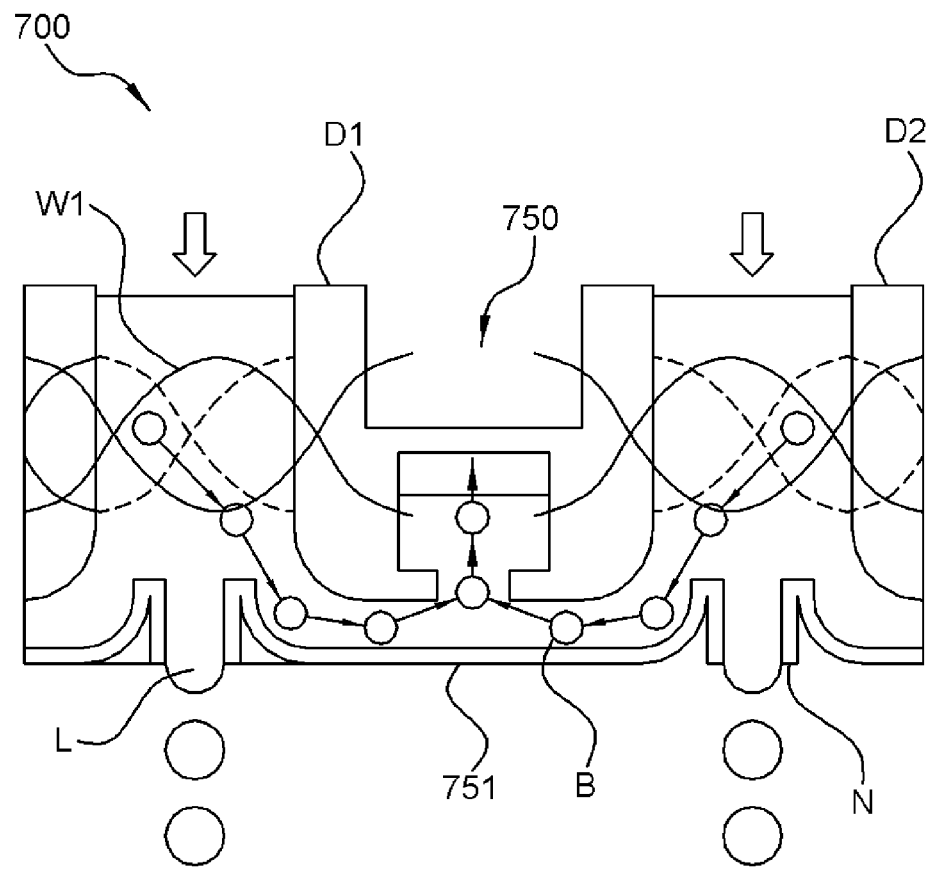
FIG. 11 is a schematic view of a bubble removal apparatus using acoustic waves according to a seventh embodiment of the present disclosure.

FIG. 11 illustrates a cross-sectional view of a bubble removal apparatus 700 according to a seventh embodiment of the present disclosure. As illustrated, the bubble removal apparatus 700 includes a reservoir 750 communicating with a plurality of dispensers D1 and D2, and further includes a connection passage 751 connecting the dispenser D1 (D2) and the reservoir 750. In addition, the bubble removal apparatus 700 is configured so that the bubble B in the first solution L is induced to the connection passage 751 through the standing acoustic wave W1 by applying the standing acoustic wave W1 between an inlet of the dispenser D1 (D2) and a nozzle N through an acoustic wave generator (not illustrated), and the induced bubble B is stored in the reservoir 750 through the connection passage 751.

Accordingly, the bubble on the solution discharged to the nozzle N through the dispenser D1 (D2) is removed.

Example of Acoustic Wave Generation Unit

On the other hand, the bubble removal apparatus according to an embodiment of the present disclosure may simultaneously transfer bubbles having different sizes at the same speed, and the movement speed of the bubble during phase modulation for this purpose is derived as in Equation 7 below.

$$v = \frac{\dot{\phi}}{2\pi} \times \frac{\lambda}{2} = \frac{2\pi^2 \rho |A|^2}{3\mu\lambda\left(1 - \frac{\omega_0^2}{\omega^2}\right)} \quad \text{(Equation 7)}$$

According to Equation 7 above, a transfer speed (u) of the bubble is determined by a size of the bubble, a strength of the acoustic wave, and a frequency of the acoustic wave. Therefore, when an acoustic wave with a low frequency-low phase modulation rate is applied to a large bubble and an acoustic wave with a high frequency-high phase modulation rate is applied to a small bubble, both the large bubble and the small bubble may be moved at the same speed. Therefore, through that described above, since it is possible to transfer a plurality of bubbles having various sizes at a uniform speed, there is an effect of facilitating a design of an additional structure for removing the bubble such as a reservoir.

To this end, in order to generate acoustic waves at a plurality of frequencies, a surface acoustic wave substrate in which electrodes having uneven spacing are arranged or an ultrasonic generator capable of generating the plurality of frequencies may be configured.

Figure 12A:
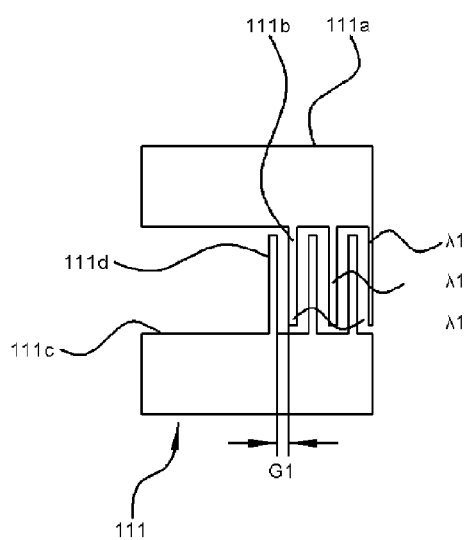
FIGS. 12A and 12B are schematic view of an acoustic wave generation unit according to an embodiment of the present disclosure.
Figure 12B:
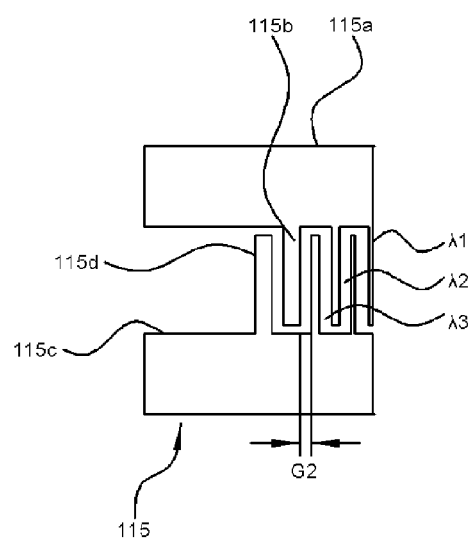
Figure 13A:
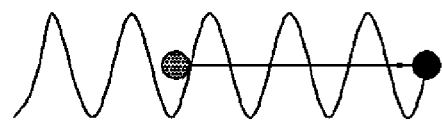
FIGS. 13A, 13B, 13C, 13D are conceptual diagrams illustrating a movement of a bubble according to the acoustic wave generation unit of the present disclosure.
Figure 13B:
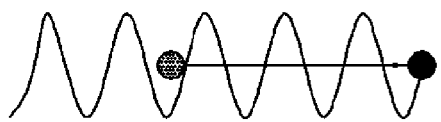
Figure 13C:
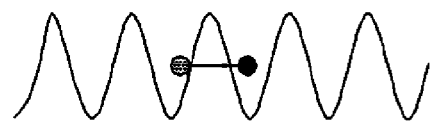
Figure 13D:
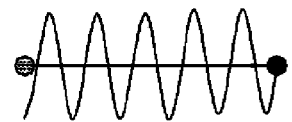

FIG. 12A illustrates a schematic view of the acoustic wave generation unit 111 according to the first embodiment of the present disclosure and FIG. 12B illustrates a schematic view of the acoustic wave generation unit 115 according to the second embodiment of the present disclosure. In addition, FIGS. 13A and 13C illustrate conceptual views illustrating the transfer of the bubbles through the acoustic wave generation unit 111 according to the first embodiment of the present disclosure, and FIGS. 13B and 13D illustrate conceptual views illustrating the transfer of the bubbles through the acoustic wave generation unit 115 according to the second embodiment of the present disclosure.

As illustrated, the acoustic wave generation unit 111 according to the first embodiment of the present disclosure may include first electrodes 111a and 111b and second electrodes 111c and 111d. The first electrodes include a first body 111a having an application direction of the acoustic wave as a length direction, and a plurality of first branches 111b extending from the first body 111a in a direction of the second electrode and disposed to be spaced apart from each other along the length direction of the first body 111a. The second electrodes include a second body 111c having an application direction of the acoustic wave as a length direction, and a plurality of second branches 111d extending from the second body 111c in a direction of the first electrode and disposed to be spaced apart from each other along the length direction of the second body 111c.

The first and second branches 111b and 111d are alternately spaced apart from each other to form a plurality of first spaced portions, and by adjusting a spacing between the first spaced portions, it is possible to adjust the wavelength or frequency of the acoustic wave generated by the acoustic wave generation unit 111. The acoustic wave generation unit 111 according to the first embodiment has respective distances G1 being uniformly disposed between the plurality of spaced portions. In this case, a plurality of wavelength acoustic waves all have the same wavelength, and when the bubbles are moved by applying the standing acoustic wave through the acoustic wave generation unit 111 according to the first embodiment of the present disclosure, the large bubble having a low resonant frequency has a high transfer speed as illustrated in FIG. 13A and the small bubble having a high resonant frequency has a slow transfer speed as illustrated in FIG. 13C, resulting in a speed difference when transferring a plurality of bubbles.

In order to solve such a speed difference, the acoustic wave generation unit 115 according to the second embodiment of the present disclosure may include third electrodes 115a and 115b and fourth electrodes 115c and 115d. The third electrodes include a third body 115a having an application direction of the acoustic wave as a length direction, and a plurality of third branches 115b extending from the third body 115a in a direction of the fourth electrode and disposed to be spaced apart from each other along the length direction of the third body 115a. The fourth electrodes include a fourth body 115c having an application direction of the acoustic wave as a length direction, and a plurality of fourth branches 115d extending from the fourth body 115c in a direction of the third electrode and disposed to be spaced apart from each other along the length direction of the fourth body 115c.

The third and fourth branches 115b and 115d are alternately spaced apart from each other to form a plurality of second spaced portions, and by adjusting a spacing between the second spaced portions, it is possible to adjust the wavelength or frequency of the acoustic wave generated by the acoustic wave generation unit 115. The acoustic wave generation unit 115 according to the second embodiment has respective distances G2 being uniformly disposed between the plurality of spaced portions. In this case, each of the plurality of wavelength acoustic waves becomes multi-wavelengths acoustic waves having different wavelengths. When the bubbles are moved by applying the standing acoustic wave through the acoustic wave generation unit 115 according to the second embodiment of the present disclosure, it is possible to apply a standing acoustic wave with a wavelength optimized for the size of each bubble. Therefore, as illustrated in FIG. 13B, a large bubble having a low resonant frequency is transferred through a standing acoustic wave having a low phase modulation rate at a low frequency, and as illustrated in FIG. 13D, a small bubble having a high resonant frequency is transferred through a standing acoustic wave having a high phase modulation rate of a high frequency, such that all bubbles may be transferred at the same speed regardless of the sizes of the bubbles.

Meanwhile, when a surface acoustic wave device is used as the acoustic wave generator, the device is fabricated by patterning electrodes arranged in a specific shape on a piezoelectric element. As a material for the piezoelectric device, lithium niobate ($LiNbO_3$), aluminum nitride (AlN), lithium tantalite ($LiTaO_3$), and the like may be used. The electrode may be patterned by depositing a material such as aluminum or gold on the piezoelectric element using a photolithography method. In this case, the electrode may be formed in a rectangle arranged at equal intervals or a rectangle arranged by mixing several intervals.

In addition, when the acoustic wave generator is made of a flexible material, the electrode is patterned by coating a material having piezoelectric properties on a soft material that does not undergo plastic deformation due to bending, and depositing a material such as aluminum or gold on the piezoelectric material using a photolithography method. At this time, like the surface acoustic wave device, the electrode may be formed in a rectangle arranged at equal intervals or a rectangle arranged by mixing several intervals. As the soft material, plastic materials such as polyimide and polyethylene terephthalate (PET) may be used. As the piezoelectric material, zinc oxide (ZnO), aluminum nitride (AlN), lithium niobate ($LiNbO_3$), and the like may be used.

The bubble removal apparatus according to various embodiments of the present disclosure described above may be utilized between −30 to 200° C. In addition, the frequency of the acoustic wave for utilizing the bubble removal device may be between 1 MHz to 10 GHz. In addition, the bubble removal apparatus may be applied to a solution within the range of viscosity of 0.1 to 50000 mPas. In addition, in order to remove the bubble in the solution in the tube, the acoustic wave may be applied at an angle between 0.1 and 179° from the direction of flow in the tube. By using the proposed apparatus, the bubble may be removed in the flow between the maximum flow rate of 1 μm/s and 100 m/s. In this case, several acoustic wave devices may be attached to the tube to increase the movement speed of the bubble.

In the bubble removal apparatus using the acoustic waves and the bubble removal method using the same of the present disclosure according to the configuration as described above, since the bubble is separated from the substrate using the acoustic waves without the bubble being expanded or exploded, there is an effect of improving the precision and productivity of the process by preventing damage to the substrate due to the explosion of the bubble.

In addition, since the bubble is removed using the acoustic waves, the bubble removal apparatus does not act as a resistance when transferring the liquid crystal solution, thereby reducing the pressure required for transferring the solution.

In addition, since the acoustic waves generated by the acoustic wave generator are transferred to the fluid through the substrate, the acoustic wave apparatus does not come into contact with the fluid, and as a result, even the acoustic wave apparatus is applied to a solution such as a corrosive liquid, damage to the acoustic wave apparatus may be prevented, thereby reducing maintenance costs.

In addition, since acoustic waves may be transferred in the form of longitudinal waves from a liquid regardless of the physical properties of the liquid, there is an effect that may be applied to all kinds of liquids used during display and semiconductor processes.

In addition, since the present disclosure uses acoustic waves having a frequency of 10 MHz to 10 GHz, it is possible to transfer and remove a bubble having a diameter of 100 nm to 200 μm, thereby preventing a decrease in process precision due to a fine bubble.

In addition, according to the present disclosure, since it is easy to combine with various process devices used in the past, the existing process devices may be utilized, and accordingly, the cost of removing the bubble may be minimized.

Further, according to the present disclosure, since it is possible to generate a variable acoustic wave to generate an acoustic wave optimized for the object to be removed from the bubble, the bubble may be removed in the optimal condition.

The present disclosure is not to be construed as being limited to the above-mentioned embodiments. The present disclosure may be applied to various fields and may be variously modified by those skilled in the art without departing from the scope of the present disclosure claimed in the claims. Therefore, it is obvious to those skilled in the art that these alterations and modifications fall within the scope of the present invention.

DETAILED DESCRIPTION OF MAIN ELEMENTS 100, 200, 300, 400, 500, 600, 700: bubble removal apparatus
L: solution
B: bubble
W, W1, W2: standing acoustic wave
F: standing acoustic field
W3: directional acoustic wave
an: antinode
n: node
C, C1, C2, C3: substrate
10, 10a, 110, 210, 310, 410, 510, 610: acoustic wave generator
20: channel
111, 115, 311, 511: acoustic wave generation unit
111a, 115a: first electrode
111b, 115b: second electrode
112, 312, 512: acoustic wave transmission unit
211: first acoustic wave generation unit
212: first acoustic wave transmission unit
221: second acoustic wave generation unit
222: second acoustic wave transmission unit
420: bubble detection unit
430: transfer unit
450: control unit
750: reservoir
751: connection passage
N: nozzle

The invention claimed is:

1. A bubble removal apparatus using acoustic waves that remove a bubble in a solution applied to one surface of a substrate, the bubble removal apparatus comprising:
    an acoustic wave generator provided on the other surface of the substrate and applying an acoustic wave to the solution,
    wherein the acoustic wave generator forms a standing acoustic field by generating a pair of acoustic waves of the same wavelength in opposite directions and then superimposing the pair of acoustic waves, collects the bubble at an antinode of the standing acoustic field, and removes the bubble from the solution by transferring the bubble to a specific position by adjusting a position of the antinode through a phase shift of the standing acoustic field or a movement of the acoustic wave generator,
    wherein the acoustic wave generator includes:
        an acoustic wave generation unit applying an acoustic wave to the solution: and
        an acoustic wave transmission unit for acoustically coupling the substrate and the acoustic wave generation unit, and
    wherein the acoustic wave transmission unit is made of a polymer material or a liquid.

2. A bubble removal apparatus using acoustic waves that remove a bubble in a solution applied to one surface of a substrate, the bubble removal apparatus comprising:
    an acoustic wave generator provided on the other surface of the substrate and applying an acoustic wave to the solution,
    wherein the acoustic wave generator removes the bubble from the solution by transferring the bubble to the outside of the solution through a directional acoustic wave applied in one direction of the substrate,
    wherein the acoustic wave generator includes:
        an acoustic wave generation unit applying an acoustic wave to the solution: and
        an acoustic wave transmission unit for acoustically coupling the substrate and the acoustic wave generation unit, and
    wherein the acoustic wave transmission unit is made of a polymer material or a liquid.

3. A bubble removal apparatus using acoustic waves that remove a bubble in a solution applied between a pair of substrates, the bubble removal apparatus comprising:
    an acoustic wave generator provided on an outer surface of one of the substrates or an outer surface of each of the pair of substrates and applying an acoustic wave to the solution,
    wherein the acoustic wave generator forms a standing acoustic field by generating a pair of acoustic waves of the same wavelength in opposite directions and then superimposing the pair of acoustic waves, collects the bubble at an antinode of the standing acoustic field, and removes the bubble from the solution by transferring the bubble to a specific position by adjusting a position of the antinode through a phase shift of the standing acoustic field or a movement of the acoustic wave generator,
    wherein the acoustic wave generator includes:
        an acoustic wave generation unit applying an acoustic wave to the solution: and
        an acoustic wave transmission unit for acoustically coupling the substrate and the acoustic wave generation unit, and
    wherein the acoustic wave transmission unit is made of a polymer material or a liquid.

4. The bubble removal apparatus of claim 3, wherein the specific position is a peripheral portion of the pair of substrates.

5. The bubble removal apparatus of claim 1, further comprising:
    a bubble detection unit detecting the position, size, or speed of the bubble in the solution;
    a transfer unit for pulling the acoustic wave generator to transfer the acoustic wave generator to a specific position on the substrate; and
    a control unit for controlling the acoustic wave generator, the bubble detection unit, and the transfer unit.

6. A bubble removal apparatus using acoustic waves that remove a bubble in a solution accommodated or flowing in the inside of a tube, the bubble removal apparatus comprising:
    an acoustic wave generator made of a flexible material to surround the tube along a circumferential direction on an outer surface of the tube, and applying an acoustic wave to the solution,
    wherein the acoustic wave generator forms a standing acoustic field by generating a pair of acoustic waves of the same wavelength in opposite directions and then superimposing the pair of acoustic waves, collects the bubble at an antinode of the standing acoustic field, and removes the bubble from the solution by transferring the bubble to a specific position by adjusting a position of the antinode through a phase shift of the standing acoustic field,
    wherein a plurality of acoustic wave generators are disposed to be spaced apart from each other along a length direction of the tube.

7. The bubble removal apparatus of claim 6, wherein the specific position is an outer side of the tube in a radial direction.

8. The bubble removal apparatus of claim 6, further comprising:
    a reservoir communicating with the tube; and
    a connection passage connecting the tube with the reservoir,
    wherein the acoustic wave generator induces the bubble to the connection passage by transferring the bubble in the solution to an outer side of the tube in a radial direction through a standing acoustic wave, and the induced bubble is stored in the reservoir.

9. The bubble removal apparatus of claim 8, wherein the connection passage is formed to be inclined upwardly toward the reservoir.

10. The bubble removal apparatus of claim 9, wherein the tube is a dispenser having an inlet formed at one side and a nozzle formed at the other side, and
    the acoustic wave generator is configured to apply the standing acoustic wave between the inlet and the nozzle.

11. The bubble removal apparatus of claim 1, wherein the acoustic wave generator includes a pair of electrodes disposed such that a plurality of spaced portions are formed, and applies a plurality of acoustic waves having different wavelengths to the solution by spacing distances of the spaced portions disposed to be different from each other.

12. The bubble removal apparatus of claim 1, wherein the acoustic wave generator applies an acoustic wave having a frequency between 10 MHz to 10 GHz to the solution.

13. The bubble removal apparatus of claim 1, wherein the acoustic wave generator removes bubbles having a diameter of 100 nm to 200 µm.

14. A bubble removal method using the bubble removal apparatus using acoustic waves of claim 1, the bubble removal method comprising:
- forming a standing acoustic field by generating a pair of acoustic waves of the same wavelength in opposite directions through an acoustic wave generator and then superimposing the pair of acoustic waves;
- collecting a bubble at an antinode of the standing acoustic field by applying the standing acoustic field to a solution; and
- removing the bubble from the solution by transferring the collected bubble to a specific position by moving the antinode through a phase shift of the standing acoustic field or a movement of the acoustic wave generator.

15. A bubble removal method using the bubble removal apparatus using acoustic waves of claim 6, the bubble removal method comprising:
- forming a standing acoustic field by generating a pair of acoustic waves of the same wavelength in opposite directions through an acoustic wave generator and then superimposing the pair of acoustic waves;
- collecting a bubble at an antinode of the standing acoustic field by applying the standing acoustic field to a solution; and
- removing the bubble from the solution by transferring the collected bubble to a specific position by moving the acoustic wave generator through a transfer unit.

16. The bubble removal method of claim 15, further comprising: before the forming of the standing acoustic field,
- detecting a position of the bubble in the solution through a bubble detection unit; and
- moving the acoustic wave generator to be close to the bubble through the transfer unit.

* * * * *